United States Patent
Wu et al.

(10) Patent No.: US 7,197,159 B2
(45) Date of Patent: Mar. 27, 2007

(54) AMPLITUDE SHIFTED INFORMATION EMBEDDING AND DETECTION METHOD BASED UPON THE PHASE EQUALIZATION

(75) Inventors: Guo-Zua Wu, Taichung (TW); Wen-Hsing Hsu, Hsinchu (TW)

(73) Assignee: Industrial Technology Research Institute, Chu-Tung Hsinchu Hsien (TW)

( * ) Notice: Subject to any disclaimer, the term of this patent is extended or adjusted under 35 U.S.C. 154(b) by 790 days.

(21) Appl. No.: 10/331,986

(22) Filed: Dec. 31, 2002

(65) Prior Publication Data

US 2004/0052399 A1    Mar. 18, 2004

(30) Foreign Application Priority Data

Sep. 17, 2002    (TW) .................................. 91121214 A

(51) Int. Cl.
*G06K 9/00*    (2006.01)
(52) U.S. Cl. ...................... 382/100; 382/205; 382/232; 382/240
(58) Field of Classification Search ................ 382/100, 382/232, 240, 205; 380/38, 238, 219
See application file for complete search history.

(56) References Cited

U.S. PATENT DOCUMENTS

| | | | | |
|---|---|---|---|---|
| 5,995,241 A | * | 11/1999 | Nakatani et al. | 382/250 |
| 6,513,004 B1 | * | 1/2003 | Rigazio et al. | 704/254 |
| 6,532,541 B1 | * | 3/2003 | Chang et al. | 713/176 |
| 6,680,972 B1 | * | 1/2004 | Liljeryd et al. | 375/240 |
| 2002/0131617 A1 | * | 9/2002 | Pelly et al. | 382/100 |

* cited by examiner

*Primary Examiner*—Jingge Wu
*Assistant Examiner*—Shefali Patel
(74) *Attorney, Agent, or Firm*—Birch, Stewart, Kolasch & Birch, LLP

(57) ABSTRACT

An amplitude shifted information embedding and detection method based upon the phase equalization is disclosed. It utilizes an equalization function to perform equalization computations on the DCT coefficients of an image. Through pixel shift, the original DCT coefficients have energy changes. Such changes are used to generate a visually compatible image with keys embedded at the same time. The information embedded image is very robust in the sense that the key information can still be accurately restored without comparing with the original image even if it is destroyed.

10 Claims, 9 Drawing Sheets

(a)

(b)          (c)          (d)          (e)

(a)
Original Subband DCT Coefficient (b)
DCT Coefficient after 1-pixel waveform shift (c)
DCT Coefficient after 2-pixel waveform shift (d)
DCT Coefficient after 3-pixel waveform shift

| Block(1,1) | Block(1,2) | Block(3,1) |
| --- | --- | --- |
| Block(2,1) | Block(2,2) | Block(3,2) |
| Block(3,1) | Block(3,3) | Block(3,3) |

FIG. 5

(A)  
Original image (B)  
Information embedded image $$F(u,v) = \frac{4C(u)C(v)}{N^2} \sum_{i=0}^{N-1} \sum_{j=0}^{N-1} f(i,j) \cos[\frac{(2i+1)}{2N} u\pi] \cos[\frac{(2j+1)}{2N} v\pi]$$

(A)

$$f(i,j) = \sum_{u=0}^{N-1} \sum_{v=0}^{N-1} C(u)C(v) F(u,v) \cos[\frac{(2i+1)}{2N} u\pi] \cos[\frac{(2j+1)}{2N} v\pi]$$

AMPLITUDE SHIFTED INFORMATION EMBEDDING AND DETECTION METHOD BASED UPON THE PHASE EQUALIZATION

BACKGROUND OF THE INVENTION

Field of Invention

The invention relates to an information embedding method and, in particular, to a method of embedding key information into an image by using an equalization operation on the DCT coefficients of a subband image and processing pixel shifts in the subband image.

Related Art

In the digital era, information digitalization has become the trend. However, due to the ease in propagating and copying digital information (such as pictures, videos, voices, etc), protection of digital data is not as easy as conventional ones. The relevant issues about intelligent properties (IP's) have also received a lot of attention. To secure digital data transmissions and to prevent hackers from eavesdropping and destroying, a widely adopted method is the "information embedding technology". The so-called information embedding technology refers to the technique of embedding some key information completely unrelated to the original digital data so that an unauthorized third party (one who does not know the key information) is not able to know the existence of the embedded information. This technique is used to discourage hackers from destroying and eavesdropping the transmitted digital data. A commonly used information embedding method is to hide information in the original digital data, producing new digital data. The newly generated digital data look the same as the original digital data by the human visual system. Therefore, the unauthorized person can hardly tell the difference. However, an authorized user can rapidly and simply restore the key information hidden therein. This certainly has a great value for protecting and justifying the author's IP's.

Basically, the normal information embedding technology has to have the following features: (1) It is not easy to be noticed or detected. In other words, after the key information is embedded a normal image processing method is not able to detect it. The minute changes should not be noticed by the human visual system. (2) It is robust. After the key information is embedded, the digital data should be able to defend against all sorts of attacks, such as image processing, magnifications, shrinking, rotations, compressions and modifications. (3) It does not need the original digitial data. During the detection and restoration process of the key information, the method should not need another copy of the origial digital data. Only if the technology has the abovementioned features will the embedded information truly achieve the desired effects.

The conventional information embedding technology has two types: frequency domain and space domain. Simply using the frequency domain to perform information embedding often has the problems of complicated operations and limited embedded information. Simply using the space domain to perform information embedding, on the other hand, faces the problems of being very easy to be destroyed and resulting in data distortions. Therefore, it is crucial to find a method that fully makes use of the advantages of both frequency domain and space domain information embedding technologies. It is hopeful to develop an effective and robust information embedding technology that can be applied to all kinds of dynamic audio/video (AV) data and provide its users to quickly and easily perform information detection as well.

SUMMARY OF THE INVENTION

In view of the foregoing problems, the invention provides an amplitude shifted information embedding and detection method based upon the phase equalization. Its primary objective is to utilize an equalization function operation and a pixel shift method to produce energy changes in the DCT coefficients of the image. It further generates an image embedded with key information that is robust and unlikely to be detected. The invention can provide a simple method to quickly and accurately restore the original key information without comparison with the original image.

The disclosed amplitude shifted information embedding and detection method based upon the phase equalization includes the steps of: determining embedded keys, performing an coversion for the original image, adjusting coefficients to satisfy the equalization function, performing an inverse conversion for the original image, adjusting a subband image according to a phase shift, and recombining all subbands to generated an information embedded image In addition, the disclosed amplitude shifted information embedding and detection method based upon the phase equalization includes the steps of: extracting the embedded keys, using a phase shift to perform inverse shift processing on the subband corresponding to the phase shift coefficient of the information embedded image, performing conversions on the information embedded image to obtain a first verification value of the matrix coefficient corresponding to each subband, computing a second verification value of the original coefficient using the equalization function, comparing the first verification value and the second verification value, and confirming that the information embedded image is the original image.

BRIEF DESCRIPTION OF THE DRAWINGS

The invention will become more fully understood from the detailed description given hereinbelow illustration only, and thus are not limitative of the present invention, and wherein:

FIG. 5 is a shematic view of the average value equalization function using the disclosed method;

FIG. 9 is a schematic view of the DCT function used in the disclosed method.

DETAILED DESCRIPTION OF THE INVENTION

The disclosed amplitude phase-shift information embedding and detection method based upon the phase equalization mainly makes use of human visual characters to select the frequency domain discrete cosine transform (DCT) coefficients of several subband images. The DCT coefficients are processed using a normal equalization function. When the image is converted back to the space domain, it is further processed using the pixel shift, so that naked eyes cannot detect the difference in the image. The DCT coefficients, however, are largly modified to embed key information therein.

Figure 3:
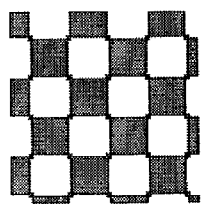
FIG. 3 is a schematic view of the monotonic image processed using the disclosed method.
Figure 3:
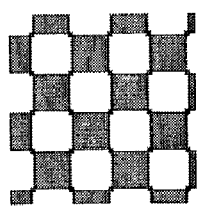
Figure 3:
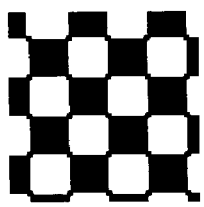
Figure 3:
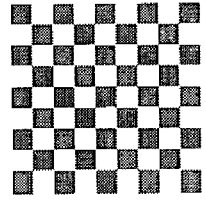
Figure 3:
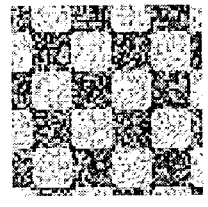
Figure 4:
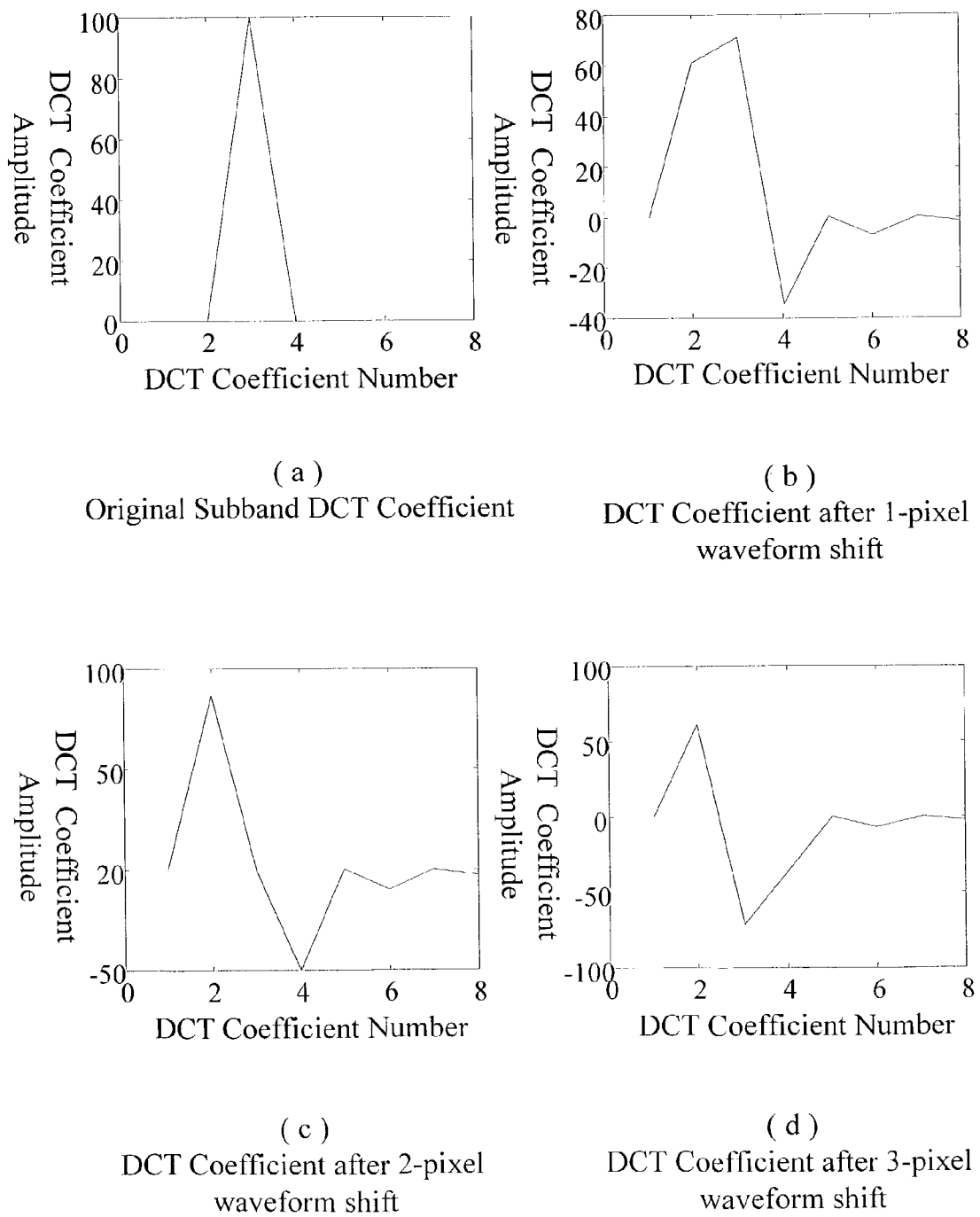
FIG. 4 is a schematic view of the space shifted matrix coefficient using the disclosed method.

With reference to FIG. 3, FIG. (a) is the original image; FIG. (b) is the original image shift; FIG. (c) is the contrast-enhanced image; FIG. (d) is the shrunk image; and FIG. (e) is the original image added with noises. Owing to the special characters of human eyes, the original image processed as in FIGS. (c), (d), and (e) can be easily recognized, resulting in the failure of hiding the embedded information. On the other hand, the change in FIG. (b) is most unlikely to be noticed by human eyes. In this sense, processing the original image using the pixel shift method is better among others. As described before, although the pixel-shifted image and the original image do not differ much in front of human eyes, the difference in the frequency domain is immense because the DCT coefficients of all the shifted subbands are largely modified. FIG. 4 shows the experimental results. FIG. (a) shows the sample value of the DCT coefficient of a particular subband in the space domain. FIGS. (b), (c), and (d) show the changes in values of the DCT coefficient are −30, −100, and −170 after shifting the pixels 1, 2, and 3, respectively. Therefore, one can use this property to embed key information. To enhance the robustness of the embedded key information for minimizing the probability of being detected by an unauthorized third party, a normal equalization function can be used to process the DCT coefficients before pixel shifting. For example, one can use the "average method" to compute the initial DCT coefficient of the subband image that is to be pixel shifted. As shown in FIG. 5, the initial DCT coefficient of the block (2,2) can be obtained by averaging over the adjacent eight blocks. Alternatively, one can use the "sorting method" or other usual equalization functions to achieve the goal of securely embedding the key information.

Figure 1:
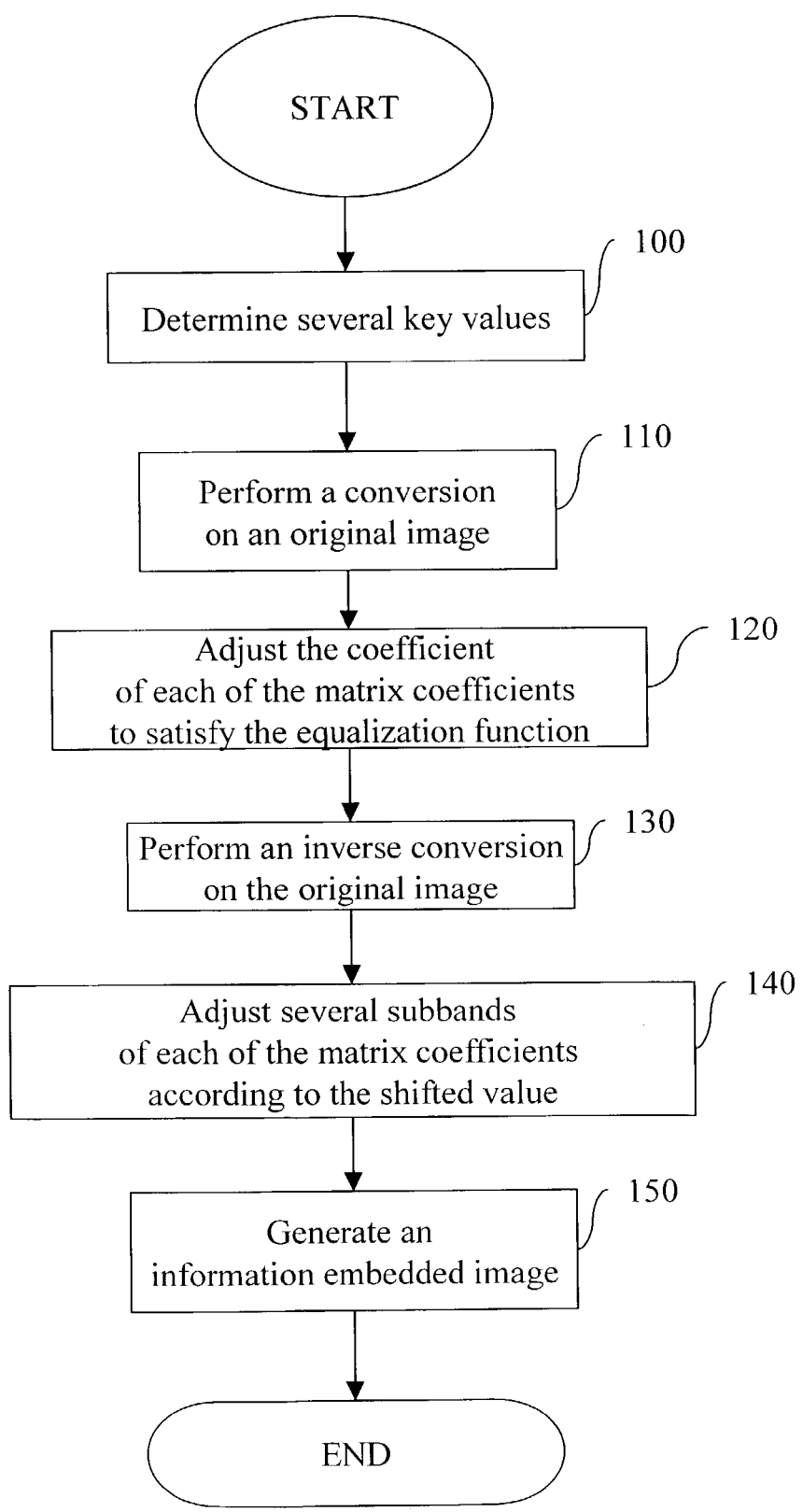
FIG. 1 is an information embedding flowchart of the amplitude shifted information embedding and detection method based upon the phase equalization.

In the following text, we explain the amplitude shifted information embedding method based upon the phase equalization. With reference to FIG. 1, key information to be embedded is first determined (step 100). The key information includes: shifted coefficients, a shifted value, and an equalization function. The shifted coefficients refer to the coordinates of DCT coefficients to be embedded with information. Normally, they can be determined through random variables from an 8×8 DCT matrix of a subband. The shifted value refers to the shifted amount to be used. It is also generated by random variables. The equalization function refers to the operation formula for the DCT coefficients. Afterwards, the original image undergoes a conversion process (step 110). The conversion process (as shown in part (A) of FIG. 9 where F(u,v) means the DCT coefficient at the frequency domain position (u, v)) refers to the conversion of an image from a space domain to a frequency domain using a forward discrete cosine transform (FDCT) function. The previously determined shifted coefficients are then processed using the equalization function so that each of the selected DCT coefficients can satisfy the equalization function (step 120). Taking "the average method" as an example, the values of each of the selected DCT coefficients has to satisfy the function operation result given in FIG. 5. Afterwards, the image goes through an inverse conversion process (step 130). The inverse conversion process (as shown in part (B) of FIG. 9 where f(i,j) refers to the pixel value at the space domain position (i,j)) uses an inverse discrete cosine transform (IDCT) function to convert an image from the frequency domain to the space domain. Finally, the selected shifted value is used to shift the subband of each DCT coefficient (step 140). An image embedded with the desired key information is thus generated (step 150).

Figure 2:
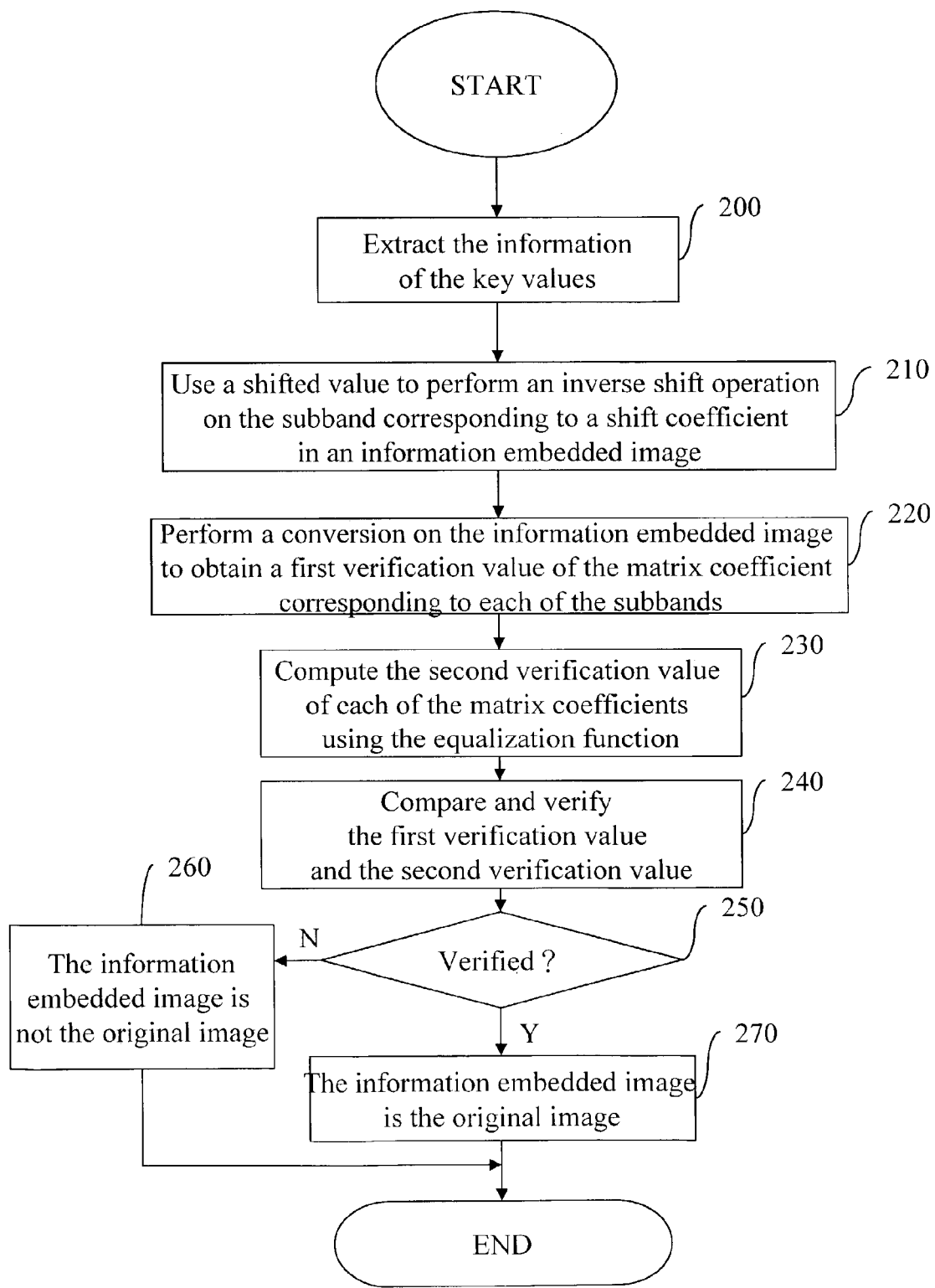
FIG. 2 is an information detection flowchart of the amplitude shifted information embedding and detection method based upon the phase equalization.

FIG. 2 explains the amplitude shifted information detection method based upon the phase equalization. Since the information detection procedure has to use appropriate key information, the first step is to obtain the originally used key information (step 200). The information still includes three parts: the shifted coefficients, the shifted value, and the equalization function. These three parts have to be exactly the same as the ones used for embedding the key information. The subband corresponding to each of the shifted coefficients is performed with an inverse shift action (step 210). The information embedded image undergoes an FDCT conversion (step 220). In this way, the DCT coefficient value corresponding to each subband can be obtained. This is the first verification value. The equalization function is then used to compute the DCT coefficient of each subband, obtaining the second verification value (step 230). The first verification value and the second verification value are compared and verified (step 240). The system determines whether the two verification values are the same (or within an acceptable error range) (step 250). If they are not the same, then the received image is determined to be different from the original image (step 260). Otherwise, the detected image is the original image (step 270).

Figure 6:
FIG. 6 is a schematic view of the orignal image and the information embedded image using the disclosed method.
Figure 6:
Figure 6:
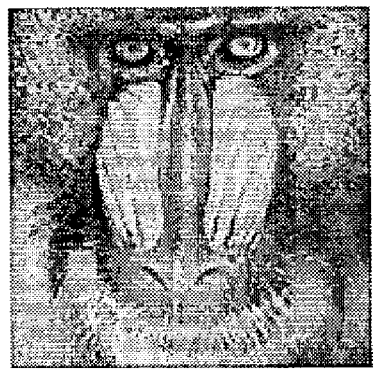
Figure 6:
Figure 7:
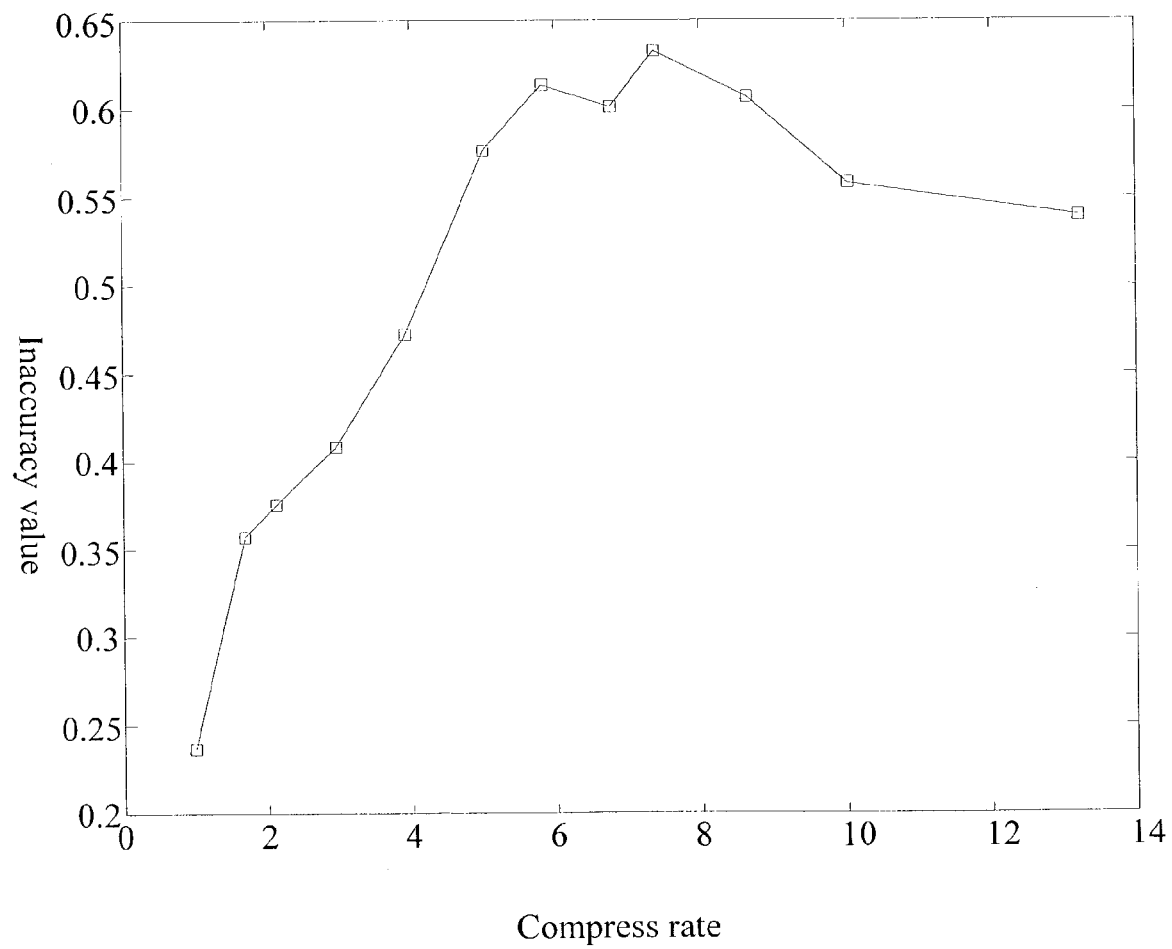
FIG. 7 is a schematic view of the anti-compression experiment for the disclosed method.
Figure 8:
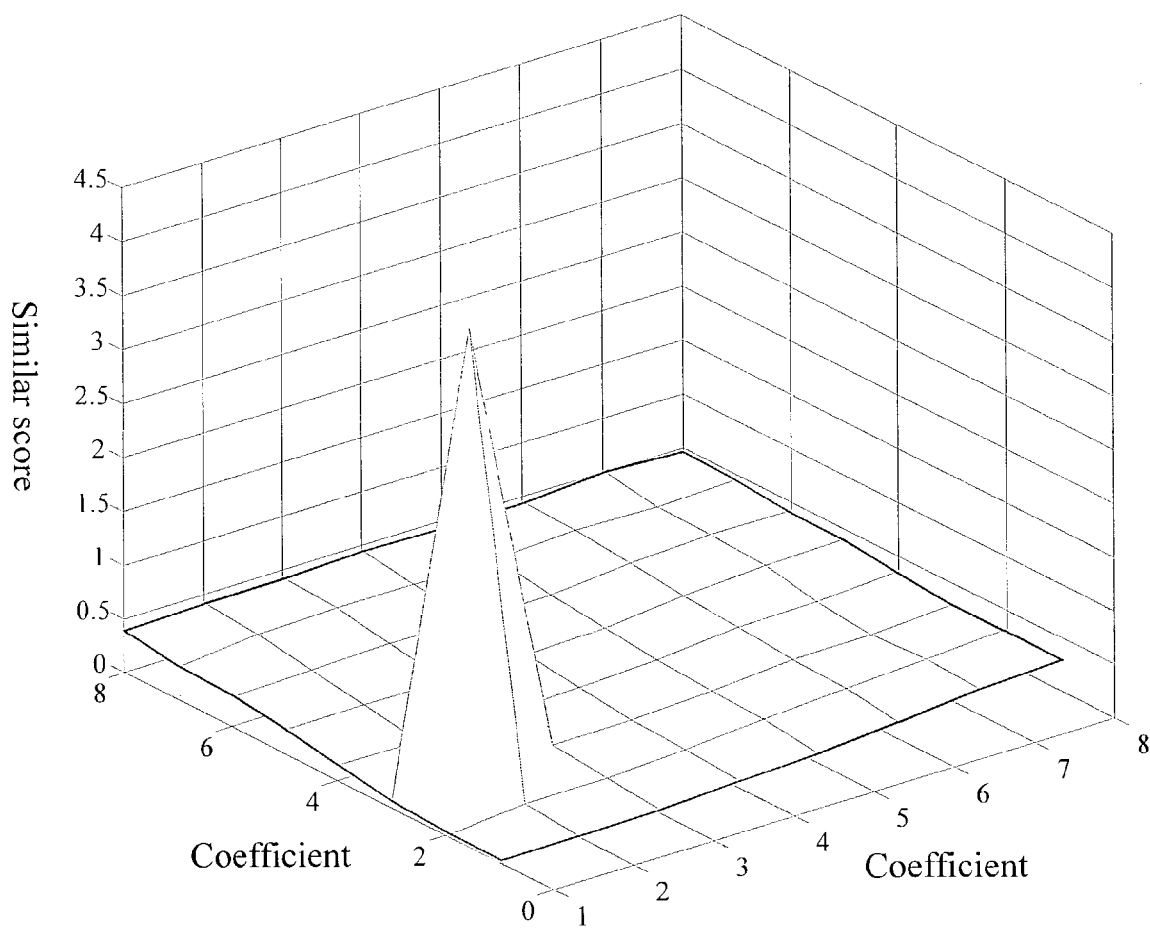
FIG. 8 is a schematic view of the key value experiment for the disclosed method.

One can see from parts (A) and (B) in FIG. 6, the original image and the information embedded image using the disclosed method do not look different visually. Therefore, the embedded information is not easy to be detected. On the other hand, from the anti-compression experiment shown in FIG. 7, one can further discover that the invention can still detect correct key information even after some extent of destruction. This proves the robustness of the disclosed method. Finally, FIG. 8 also proves that only when the correct key information is used can one correctly detect the information embedded in the image. This shows the security of the invention.

Effects of the Invention

The disclosed amplitude shifted information embedding method based upon the phase equalization utilizes the characters of human vision to change the DCT coefficients in the frequency domain in the image by shifting pixels in the space domain. This can readily generate an image embedded with key information that cannot be easily detected. With the help of an equalization function, the embedded key information becomes more robust. The difficulties in detection and restoration are also higher. This helps protecting the original image. Furthermore, according to the disclosed method the information can be efficiently recovered as long as the key value is known.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An amplitude shifted information embedding method based upon phase equalization that embeds information into an image by generating energy change from shifts in subband images, the method comprising the steps of:
    determining a plurality of key values, the key values including shifted coefficients, a shifted value, and an equalization function, the shifted coefficients referring to a plurality of coordinates of discrete cosine transform (DCT) coefficients to be the embedded information, the shifted value referring to the shifted amount generated by random variables, the equalization function referring to the operation formula for the DCT coefficients;
    performing a conversion on an original image;
    adjusting each of the DCT coefficients to satisfy the equalization function;
    performing an inverse operation on the original image;
    adjusting a plurality of subbands of the DCT coefficients according to the shifted value; and
    generating an information embedded image.

2. The method of claim 1, wherein the shifted coefficients refer to a plurality of coefficient coordinates generated in random variables from an 8×8 discrete cosine transform (DCT) matrix.

3. The method of claim 1, wherein the equalization function is an average function.

4. The method of claim 1, wherein the equalization function is a sorting function.

5. The method of claim 1, wherein the conversion refers to a forward discrete cosine transform (FDCT) of the DCT coefficients.

6. The method of claim 1, wherein the inverse conversion refers to an inverse discrete cosine transform (IDCT) of the DCT coefficients.

7. An amplitude shifted information detecting method based upon phase equalization that detects information embedded in an image by restoring energy from inverse shifts in subband images, the method comprising the steps of:
    extracting a plurality of key values, the key values including shifted coefficients, a shifted value, and a equalization function, the shifted coefficients referring to a plurality of coordinates of discrete cosine transform (DCT) coefficients to be the embedded information, the shifted value referring to the shifted amount generated by random variables, the equalization function referring to the operation formula for the DCT coefficients;
    using the shifted value to process an inverse shift on a plurality of subbands corresponding to the shifted coefficient in an information embedded image;
    performing a conversion on the information embedded image to obtain a first verification value of the matrix coefficient corresponding to each of the subbands;
    using the equalization function to compute a second verification value of each of the matrix coefficients;
    comparing the corresponding first verification value and second verification value;
    checking whether all comparisons indicate an agreement; and
    confirming that the information embedded image is the original image.

8. The method of claim 7, wherein the shifted coefficients refer to a plurality of coefficient coordinates generated in random variables from an DCT matrix.

9. The method of claim 7, wherein the equalization function is an average function.

10. The method of claim 7, wherein the conversion refers to a forward discrete cosine transform (FDCT) of the DCT coefficients.

* * * * *